(12) United States Patent
Schleiminger et al.

(10) Patent No.: US 12,316,080 B2
(45) Date of Patent: May 27, 2025

(54) PLIERS-TYPE CUTTING TOOL

(71) Applicant: KNIPEX—Werk C. Gustav Putsch KG, Wuppertal (DE)

(72) Inventors: Jan Schleiminger, Solingen (DE); Mario Mosler, Leichlingen (DE); Kevin Liedtke, Wuppertal (DE)

(73) Assignee: KNIPEX-Werk C. Gustav Putsch KG, Wuppertal (DE)

( * ) Notice: Subject to any disclaimer, the term of this patent is extended or adjusted under 35 U.S.C. 154(b) by 263 days.

(21) Appl. No.: 17/798,588

(22) PCT Filed: Feb. 8, 2021

(86) PCT No.: PCT/EP2021/052933
§ 371 (c)(1),
(2) Date: Aug. 10, 2022

(87) PCT Pub. No.: WO2021/160549
PCT Pub. Date: Aug. 19, 2021

(65) Prior Publication Data
US 2023/0100558 A1    Mar. 30, 2023

(30) Foreign Application Priority Data
Feb. 11, 2020   (DE) .................... 10 2020 103 467.9

(51) Int. Cl.
*H02G 1/00*    (2006.01)
*B23D 29/00*   (2006.01)
(Continued)

(52) U.S. Cl.
CPC ........... *H02G 1/005* (2013.01); *B23D 29/002* (2013.01); *B23D 29/023* (2013.01); *B23D 35/001* (2013.01)

(58) Field of Classification Search
CPC .... H02G 1/005; B23D 29/002; B23D 29/023; B23D 35/001; B23D 21/06; B23D 33/00;
(Continued)

(56) References Cited

U.S. PATENT DOCUMENTS 3,902,206 A * 9/1975 Naquin ................ H02G 1/1229
7/107
4,026,018 A    5/1977 Byberg et al.
(Continued)

FOREIGN PATENT DOCUMENTS

DE    1 883 649 U    11/1963
DE    87 02 959 U1    4/1987
(Continued)

OTHER PUBLICATIONS

International Search Report of PCT/EP2021/052933, mailed May 27, 2021.
(Continued)

*Primary Examiner* — Ghassem Alie
(74) *Attorney, Agent, or Firm* — Collard & Roe, P.C.

(57) ABSTRACT

A pliers-type cutting tool has two tool legs which cross at a joint pin and are pivotable about an axis of rotation in a pivot plane with respect to one another. The tool legs form gripping portions on one side of the joint pin and a pliers mouth on the other side. Cutting of the pliers mouth pass into a position one over the other, at least radially on the outside, for the first time in a closing region. The cutting edges have in the position one over the other only in the closing region a particular free length on this central plane, and that over the free length a greatest opening width is present along an intermediate length on the central plane, and that the greatest opening width makes up a third or more of the total length of the cutting edges.

19 Claims, 8 Drawing Sheets

(51) Int. Cl.
B23D 29/02 (2006.01)
B23D 35/00 (2006.01)

(58) Field of Classification Search
CPC .......... B23D 15/14; B23D 15/02; A01G 3/02; B26B 13/06
USPC ... 30/194, 254, 257, 251, 252, 259, 261, 92, 30/94, 95, 255
See application file for complete search history.

(56) References Cited

U.S. PATENT DOCUMENTS

| | | | | |
|---|---|---|---|---|
| 4,229,881 | A * | 10/1980 | Troxel | B23D 29/023 30/254 |
| 5,638,602 | A * | 6/1997 | Wilhelm | H02G 1/005 30/90.1 |
| 5,732,471 | A * | 3/1998 | Korinek | H02G 1/1214 30/90.6 |
| 6,691,403 | B1 * | 2/2004 | Murg | H02G 1/1295 7/125 |
| 2006/0090346 | A1 * | 5/2006 | Hsieh | B23D 29/023 30/91.2 |
| 2015/0340849 | A1 | 11/2015 | Kochi et al. | |
| 2020/0094332 | A1 * | 3/2020 | Kimura | B23D 31/008 |
| 2021/0029886 | A1 * | 2/2021 | Zador | B26B 15/00 |
| 2021/0167586 | A1 * | 6/2021 | Liedtke | B25B 7/08 |

FOREIGN PATENT DOCUMENTS

| | | |
|---|---|---|
| DE | 195 06 457 A1 | 8/1996 |
| DE | 297 03 308 U1 | 6/1998 |
| DE | 195 06 457 C2 | 2/2001 |
| DE | 10 2018 110 105 A1 | 10/2019 |
| EP | 2 915 618 A1 | 9/2015 |

OTHER PUBLICATIONS

Klein Tools, "Klein Tools 63035 Utility Cable Cutter", Retrieved on: Oct. 26, 2006, XP055804990 URL:https://www.amazon.com/Utility-Cutter-Klein-Tools-63035/dp/B000OMN9F2/ref=psdc_553186_t1_B0002RI79M.

* cited by examiner

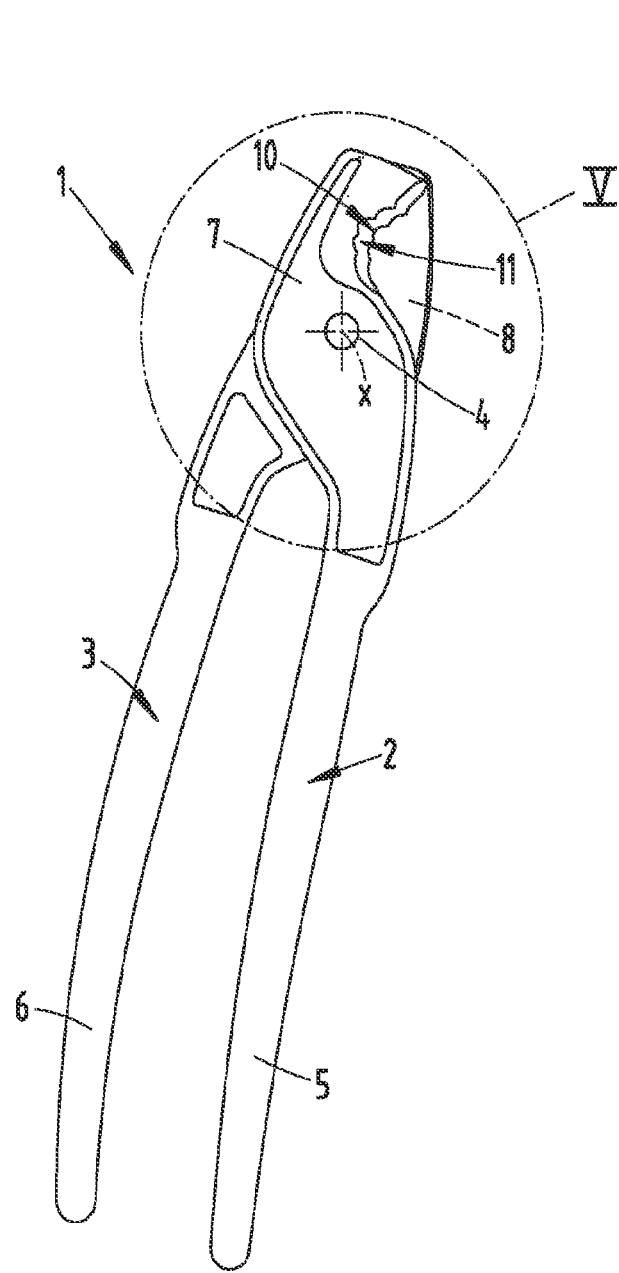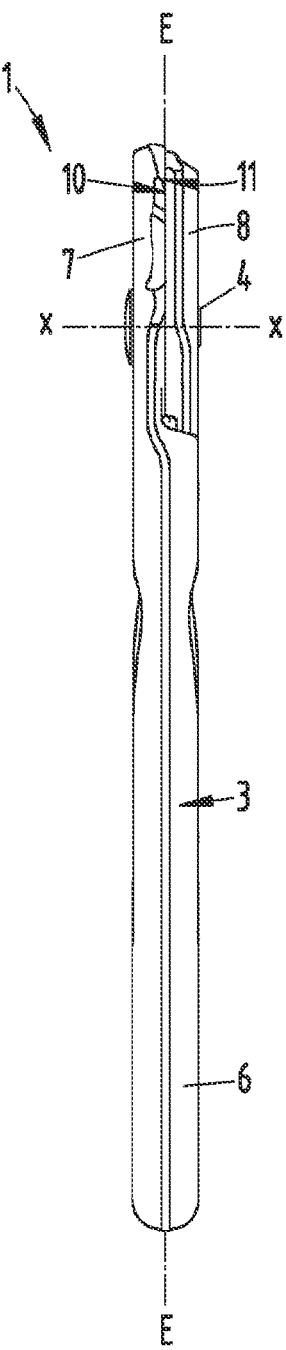

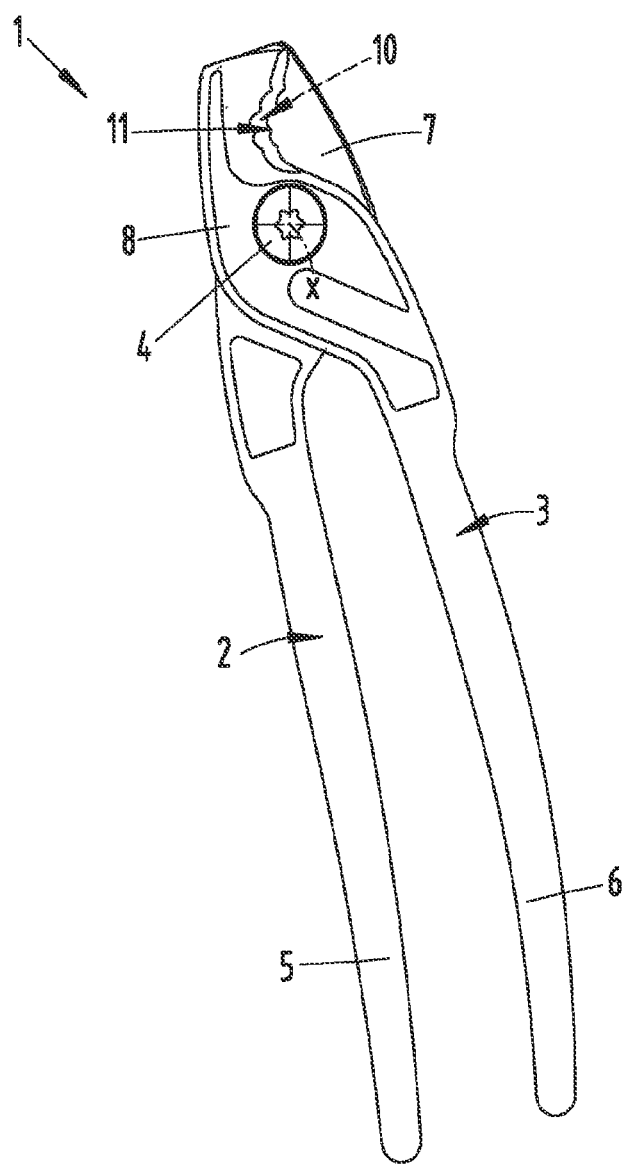

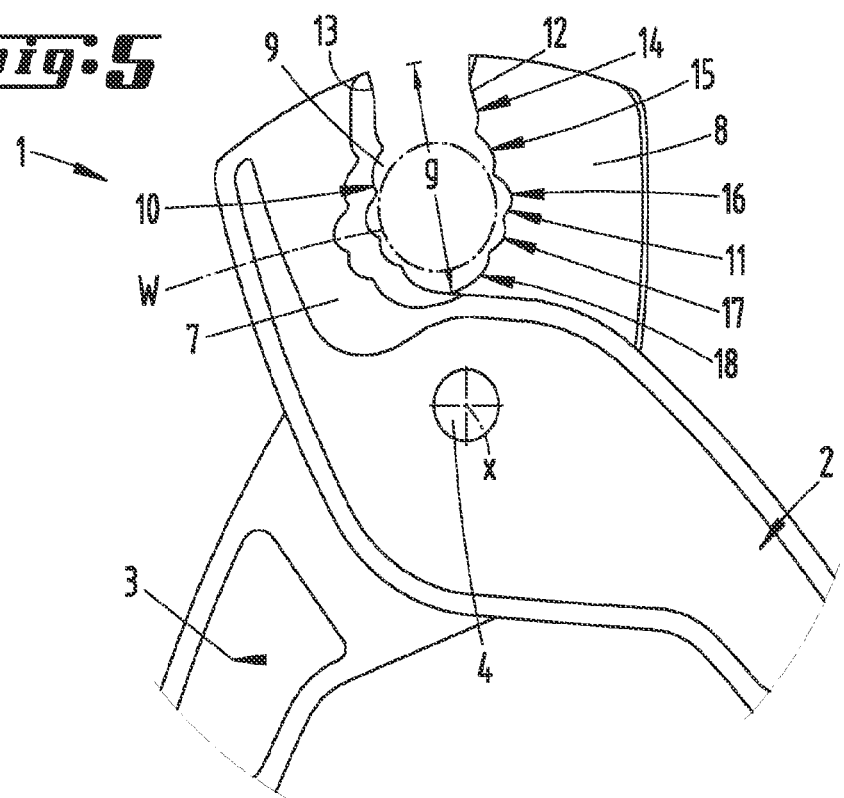
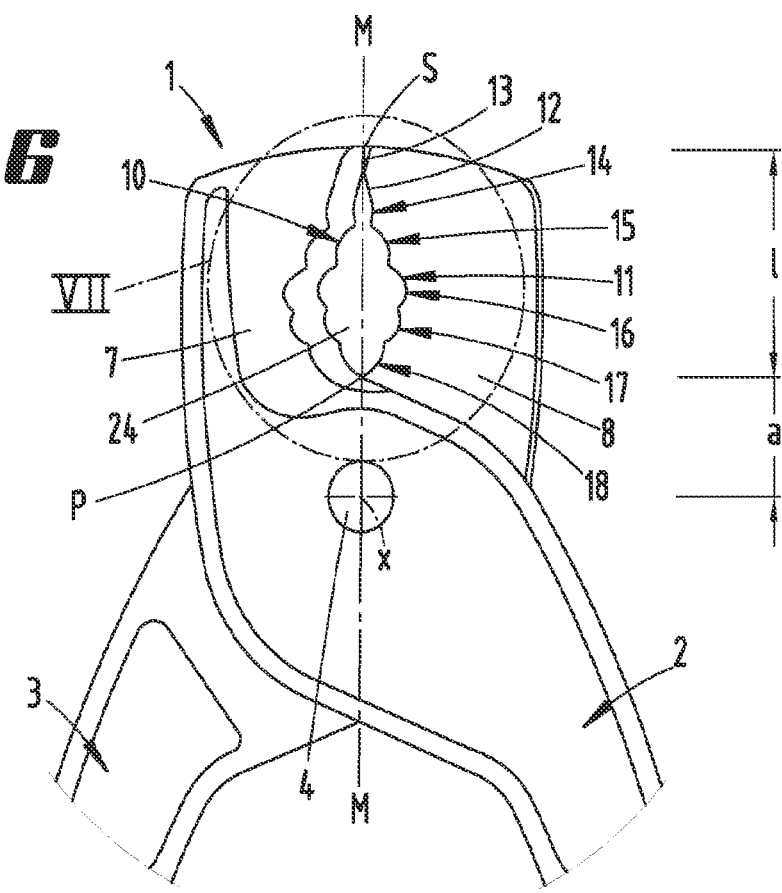

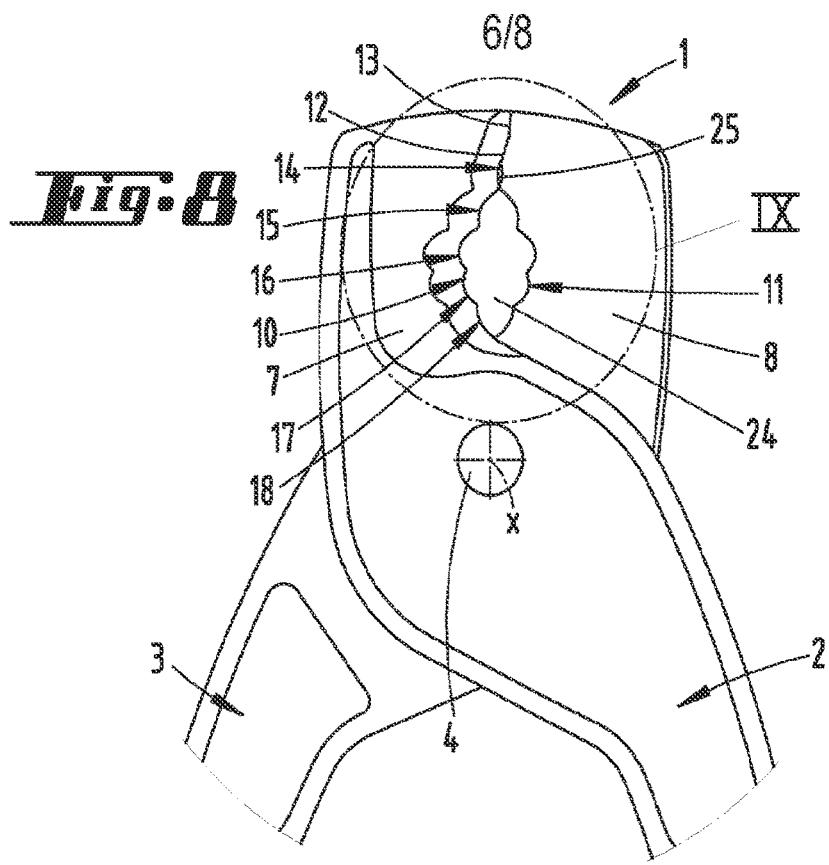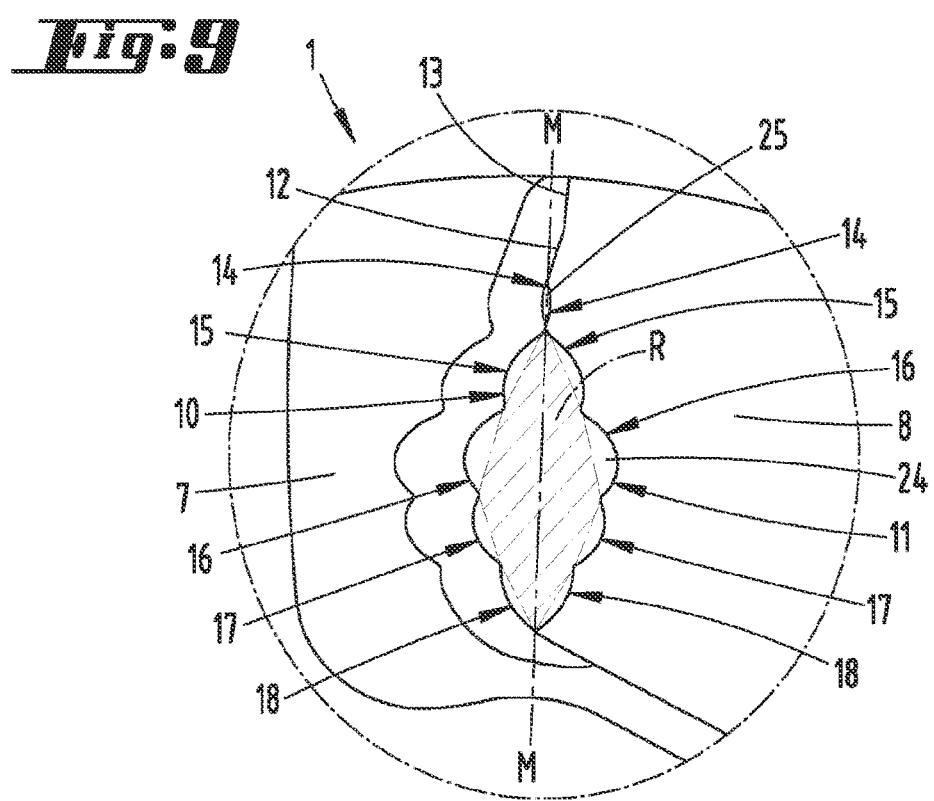

PLIERS-TYPE CUTTING TOOL

CROSS REFERENCE TO RELATED APPLICATIONS

This application is the National Stage of PCT/EP2021/052933 filed on Feb. 8, 2021, which claims priority under 35 U.S.C. § 119 of German Application No. 10 2020 103 467.9 filed on Feb. 11, 2020, the disclosure of which is incorporated by reference. The international application under PCT article 21(2) was not published in English.

TECHNICAL FIELD

The invention initially pertains to a pliers-type cutting tool with two tool legs that are pivotable relative to one another about a rotational axis along a pivot plane, wherein the tool legs form handle sections on one side of the rotational axis and a pliers mouth on the other side, wherein working faces of the pliers mouth furthermore are designed in the form of cutting edges, which during a movement into a closed position of the cutting tool arrive in a superimposed position in a closing region for the first time in a first closed position radially outside of a remaining opening region viewed from the rotational axis, wherein multiple cutting regions, which are oppositely formed on the working faces, respectively have their own curvature contour and form the opening region, follow radially inward in such a position, and wherein the cutting edges furthermore have with respect to a central plane, which stands perpendicular to the pivot plane and extends through the rotational axis and the closing region, a free length starting from the closing region and proceeding in the direction of the rotational axis on the central plane in the first closed position.

The invention also pertains to a pliers-type cutting tool with two tool legs that are pivotable relative to one another about a rotational axis in a pivot plane, wherein the tool legs form handle sections on one side of the rotational axis and a pliers mouth on the other side, wherein working faces of the pliers mouth furthermore are designed in the form of cutting edges, which during a movement into a closed position of the cutting tool arrive in a superimposed position in a closing region for the first time in a first closed position radially outside of a remaining opening region, wherein the cutting edges furthermore have with respect to a central plane, which stands perpendicular to the pivot plane and extends through the rotational axis and the closing region, a free length starting from the closing region and proceeding in the direction of the rotational axis on the central plane in the first closed position, wherein both cutting edges furthermore have separated concave cutting regions over the free length, and wherein a cutting region has a greatest depth with respect to a perpendicular to an imaginary straight line, which closes the cutting region and respectively lies on a pointedly ending web that separates a respective cutting region from an adjacent cutting region.

The invention furthermore pertains to a pliers-type cutting tool with two tool legs that are pivotable relative to one another about a rotational axis along a pivot plane, wherein the tool legs form handle sections on one side of the rotational axis and a pliers mouth on the other side, wherein working faces of the pliers mouth furthermore are designed in the form of cutting edges, which during a movement into a closed position of the cutting tool arrive in a superimposed position in a closing region for the first time in a first closed position radially outside of a remaining opening region viewed from the rotational axis, wherein multiple cutting regions, which are oppositely formed on the working faces, respectively have their own curvature contour and form the opening region, follow radially inward in the first closed position, wherein the cutting edges furthermore have with respect to a central plane, which stands perpendicular to the pivot plane and extends through the rotational axis and the closing region, a free length starting from the closing region and proceeding in the direction of the rotational axis on the central plane in the first closed position, and wherein a greatest opening width respectively results for two opposite cutting regions viewed in a direction transverse to the central plane.

PRIOR ART

Cutting tools of the type in question are known in different designs, particularly for cutting through tubes, cables and lines of copper, steel or fiberglass. Such cutting tools are furthermore known in the form of so-called cable cutters or cable cutting pliers, wherein the handle sections of pliers-type tools preferably are designed in an elongated rod-like manner, particularly without the formation of an eyelet-like opening for the fingers.

A cutting tool of this type is furthermore known, for example, from DE 1 883 649 U. The cable shears known from this publication are designed differently with respect to the cutting regions of the cutting edges. The cutting regions are not formed opposite of one another, but rather offset relative to one another.

U.S. Pat. No. 4,026,018 A discloses a pliers-type cutting tool that only has a second cutting region, wherein the opening width of this second cutting region is greater than that of the first cutting region. The cutting regions extend linearly. A cutting tool with only two cutting regions is also known from US 2015/0340849 A1.

DE 29703308 U discloses cable shears that do not have multiple cutting edges starting from a closing region. A cable cutter that is comparable to the aforementioned publications is known from DE 19506457 C2.

Such pliers-type cutting tools particularly are also known in a design in which the tool legs intersect in a joint region. In this respect, we refer, for example, to DE 297 03 308 A1, DE 87 02 959 U and DE 10 2018 110 105 A1. The invention particularly pertains to pliers-type cutting tools with tool legs that intersect in a joint region.

The joint region can usually be formed by a joint pin. However, a joint region may also be designed with a radial guide, wherein we refer, for example, to EP 2 915 618 A1 in this respect.

SUMMARY OF THE INVENTION

Based on the aforementioned prior art, the invention aims to disclose a pliers-type cutting tool that has an advantageous design, particularly with respect to an improved cutting result.

This objective is initially attained with a cutting tool, in which it is proposed that a maximum opening width between the cutting edges is in the first closed position formed over the free length in a direction transverse to the central plane, in that the maximum opening width amounts to one-third or more of an overall length of the cutting edges, wherein the overall length extends along a straight line that begins at an intersecting point with the opposite cutting edge located near the joint and a free end f the cutting edge located distant from the joint, and wherein a greatest opening width respectively results for the cutting regions, in that a second and a third cutting region are formed starting from the first cutting region, which follows the closing region in the direction of the rotational axis, wherein the greatest opening width of the second and the third cutting region is respectively greater than the greatest opening width of each of the preceding cutting regions, in that the respective opposite cutting regions have an identical cutting region length with respect to the central plane, and in that the central plane forms an axis of symmetry with respect to an illustration in which the pivot plane forms a surface and the central plane forms a line, wherein the visible contours of the two cutting edges and therefore the contours defining the cutting opening mirror one another to both sides of this axis of symmetry.

The above-defined objective is also attained with a cutting tool, in which it is proposed that each cutting edge only has three to seven cutting regions over the free length, in that at least two cutting regions of each cutting edge have a greatest depth of 0.4 millimeters or more, and in that, in a perpendicular projection of the pointedly ending webs on the central plane, the resulting distances the between along webs the central plane correspond to the individual cutting regions, wherein the distance between two webs of a cutting region corresponds to 0.7-times to 1.3-times the distance between two webs of the adjacent cutting region.

The above-defined objective is also attained with a cutting tool, in which it is proposed that at least a second and a third cutting region follow the first cutting region, which follows the closing region in the direction of the rotational axis, wherein the greatest opening width of the second and the third cutting region is respectively greater than the greatest opening width of each of the preceding cutting regions, in that the respective opposite cutting regions have an identical partial length with respect to the central plane, and in that two remaining concave cutting regions are during further closing of the cutting tool transferable into a position in which two openings remain, which with respect to the central plane are arranged adjacent to one another and separated from one another.

Last but not least, the above-defined objective is also attained with a cutting tool, in which it is proposed that cutting regions with more than two different greatest depths are provided, in that a cutting region of absolute greatest depth is with respect to the free length assigned to half of the free length or a region following the half toward the rotational axis, and in that each cutting edge has viewed in the direction of the opposite cutting edge an essentially concave, crescent-shaped contour over approximately two-thirds to three-fourths of the overall length starting from the intersecting point with the opposite cutting edge near the joint, wherein said concave contour transforms on the end of the cutting edge into two straight sections that follow in the direction of the overall length.

The invention concerns a pliers-type cutting tool, which practically is actuated like conventional pliers. It is designed with handle sections that preferably are realized without a finger opening of the type frequently provided on scissors. The free ends of the handle regions preferably do not contact one another in the closed state of the cutting tool. It is furthermore preferred that the handle regions essentially extend in a straight manner. The cutting regions with their own curvature contour preferably have a continuously concave curvature contour.

The described embodiments particularly make it possible to achieve an improved cutting result when cutting through tubes or preferably cables, particularly electric cables. A cutting opening, which is closed on all sides and in which the workpiece to be cut such as a cable lies, initially is formed in the first closing region reached in the course of the movement of the cutting jaws delimiting the cutting mouth in the direction of a closed cutting mouth position. In a projection in the direction of the rotational axis, the (first) closing region may represent a certain superimposed position of the cutting edges, particularly if these cutting edges extend in a straight manner in this or region, also only a point-like superimposed position. The formation of the (first) closing region results in a first closed position. According to one of the embodiments, point-like webs may be provided and separate the concave cutting regions from one another. These webs essentially may, optionally only sporadically, lead to an initially point-like cutting load on the workpiece to be cut in the course of the cutting movement of the cutting edges, wherein the cutting process is starting from said point-like load increasingly continued on both by essentially sides the webs in the circumferential direction of the workpiece to be cut in the course of the further closing movement of the cutting edges. In way, this a plurality of individual cuts initially may be advantageously produced over the circumference of the workpiece to be cut in or the extending direction of the cutting edge, respectively, wherein said individual cuts may in the course of a further closing movement jointly form a complete cut over the entire cross section of the workpiece to be cut. In this case, the webs may form roof-like or rounded points, but alternatively also obtuse point regions, e.g. with a straight surface.

Irrespective of the superimposed position in only the closing region, the overall length of the cutting edges therefore preferably concerns the entire cutting edge region up to a free cutting edge point that lies distant from the pivot point. The free end of a cutting edge extends from the end of the cutting edge, which in the basic radial extent lies near the rotational axis and is typically defined by a cutting point with the other tool leg, up to an end of the portion of the working region that with respect to the cutting edge extends pointedly in a cross section. This preferably is also the absolute end of the working region in the radial direction of the tool leg or the pliers mouth, respectively.

In a superimposed cutting edge position in only the (first) closing region, the maximum opening width viewed transverse to the central plane may dimensionally correspond to one-third or more, preferably two-fifth or more and up to two-thirds or more, of the overall length of the cutting edges. This also makes it possible to achieve an improved cutting result.

The straight line, starting from which the greatest depth perpendicular to the straight line is measured, lies viewed from the pliers mouth against the first contact points of the webs that separate two adjacent cutting regions from one another and optionally is tangent to these webs.

In the proposed cutting tool, this depth may amount to 0.4 mm or more, for example up to 1 mm or more, e.g. to 1.5 or 2 mm.

The distance between two point-like webs of a cutting region, which is perpendicularly projected on the central plane, preferably can correspond to approximately 70% to 130% of the corresponding distance of the cutting region located directly adjacent to this cutting region. In addition, this distance may correspond, for example, to 0.8-times or 0.95-times, furthermore to 1.15-times or 1.2-times, the distance dimension of the adjacent cutting region. Furthermore, the distance dimension may optionally also be chosen identically to the distance dimension of the adjacent cutting region. Starting from the closing region, cutting regions that follow the first cutting region in the direction of the axis rotational are designed with increasing widths opening and characterized by a respectively greater opening width. This advantageously makes it possible to increasingly displace or press a cable or similar object from a front region of the opening into a central region when the cutting tool is closed.

In a position of the tool legs in the first closed position, it is preferred that seven or less concave cutting regions, but at least three concave cutting regions, are provided and distinguishable. It is furthermore preferred to provide, for example, four or five cutting regions. In a top view in the direction of the rotational axis, four or five cutting regions with preferably concave contour of the cutting edge point, which are separated from one another by point-like webs, accordingly may be formed along a cutting edge of a cutting jaw, wherein both cutting edges preferably are designed in this way. In this context, a mirror-symmetrical design of the cutting edges with respect to the central plane may be realized.

In an embodiment with a plurality of concave cutting regions, e.g. three, four or five cutting regions, two or more cutting regions may according to a potential embodiment be realized identically or almost identically with respect to their concave design and the resulting greatest depth, namely with consideration of the inventive and preferred requirement that more than two concave cutting regions of a cutting edge have different greatest depths.

Due to the preferred arrangement of the cutting region of absolute greatest depth in a cutting edge region, which preferably lies in a half of the free length of the cutting edge located closer to the rotational axis in the first closing point or in the region of a half of this free length, respectively, the cutting edges can advantageously extend in such a way that the cutting region of absolute greatest depth arrives in an overlapping position with the opposite cutting edge toward the end of a cutting process, preferably lastly. As a result of this arrangement and design, it is furthermore possible to act upon the workpiece to be cut, e.g. a cable, in such a way that this workpiece to be cut is tendentially acted upon in the direction of the rotational axis within the cutting opening in the course of the cutting process, preferably over the entire cutting process (at least after the first closed position is reached). This likewise makes it possible to achieve an improved cutting result and/or more favorable handling that requires less force.

Over the free length in an overlapping position of the cutting edges in only the closing region, a maximum opening width may be formed on an intermediate length on the central plane between the cutting edges in a direction transverse to the central plane and the maximum opening width may amount to one-third or more of the overall length of the cutting edges and/or each cutting edge may have only three to seven cutting regions over the free length, wherein at least two cutting regions of each cutting edge have a greatest depth of 0.4 millimeters or more and, in a perpendicular projection of the pointedly ending webs on the central plane, the resulting distances between the webs along the central plane furthermore may correspond to the individual cutting regions, wherein the distance between two webs of a cutting region corresponds to 0.7-times to 1.3-times the distance between two webs of the adjacent cutting region and/or at least a second and a third cutting region follow the first cutting region, which follows the closing region in the direction of the rotational axis, wherein the greatest opening width of the second and the third cutting region is respectively greater than the greatest opening width of each of the preceding cutting regions, wherein the respective opposite cutting regions have an identical partial length with respect to the central plane and/or cutting regions with more than two different greatest depths are provided, and wherein a cutting region of absolute greatest depth is with respect to the free length assigned to half of the free length or a region following the half toward the rotational axis.

In an above-described position of the tool legs with a contact (referred to a view in the direction of the rotational axis) or an overlapping position in only the (first) closed position, a maximum opening width of the opening, which can also be referred to as cutting opening, may viewed over the free length be formed on the central plane between the cutting edges in a direction transverse to the central plane, wherein the free length may amount to nine-tenth or more of the overall length of the cutting edges and the maximum opening width may amount to approximately two-fifth or more of the overall length of the cutting edges. The free length of the cutting edges viewed along the central plane may furthermore correspond to 0.92-times to 0.99-times the overall length of a cutting edge. The first closed position accordingly may be formed near the end of the cutting edge located distant from the rotational axis.

The maximum opening width between the cutting edges viewed essentially transverse to the central plane, optionally and preferably in the region of at least one concave cutting region, may amount to more than two-fifth and up to four-fifth or more of the overall cutting edge length. In this case, the maximum opening width may be formed in the region of the concave cutting region with the absolute greatest depth.

According to a potential embodiment, the cutting edges may begin at a distance on the central plane, which starting from the rotational axis amounts to three-fifth or less of the overall the length of cutting edges. Furthermore, this distance may correspond to approximately one-third or more and up to three-fifth of the overall length of the cutting edges, according to a potential embodiment to approximately 0.5-times the overall length.

Starting from an overlapping position in only the (first) closed position, two or more radially outer concave cutting regions furthermore may with respect to the rotational axis initially only segregate successively from the free length from the radially outer side toward the radially inner side during further closing of the cutting tool or the cutting mouth, respectively. This subsequently results in a new second or additional closed position, which is offset radially inward referred to the first closed position, wherein the aforementioned radially outer concave cutting regions preferably arrive completely or alternatively also only partially in an overlapping position with the other cutting edge in this (intermediate) position such that, according to a preferred embodiment, initially formed separate partial cutting openings close in the region of these cutting regions in the course of the cutting process.

After the segregation of the radially outer concave cutting regions, another segregation of concave cutting regions preferably can take place from the radially inner side toward the radially outer side in the course of the further closing of the cutting mouth.

It is also preferred that no free length exists when the cutting tool or the cutting mouth is closed. In this case, the two cutting edges are in a completely overlapping position over their lengths such that no cutting opening is formed at this point. All cutting regions are segregated in the described sense. No free length of the cutting edges any longer exists.

According to a potential embodiment, a concave cutting region may be formed by a continuously curved cutting edge section. This continuous curvature for forming a concave cutting region, which preferably extends between two point-like webs that are spaced apart from one another essentially in the direction of the overall length of the cutting edges, may in this case furthermore be achieved with a constant radius dimension over the distance of the curvature. In a continuous curvature over the distance of the curvature, however, it would alternatively also be possible to form different radii, wherein the thusly described segments of the curvature preferably transform into one another tangentially. Consequently, they may have the same tangent at a transition. Such a cutting region may also extend in an only partially curved manner and, for example, be sectionally straight.

In another embodiment, the tool legs may in the course of a closing movement of the cutting tool be transferable into a position in which the cutting edges form in a two-sided design of the concave cutting regions an essentially rhomboidal opening when the webs of the cutting regions on each cutting edge are respectively connected to one another or connected to the central plane radially inward by an imaginary straight line. These imaginary straight lines specifically define the rhomboidal opening. However, they are also merely cited for elucidating the aforementioned rhomboidal shape with respect to the actual contour of the opening. In this context, it is furthermore preferred that an elongate rhomboidal opening is formed with a longer rhombus axis along the central plane and a shorter rhombus axis transverse to the central plane. Furthermore, the rhombus flanks may be respectively composed of multiple straight lines that connect the webs to one another, wherein said straight lines of a rhombus flank may optionally include an obtuse angle of more than 90 degrees up to less than 180 degrees, e.g. an angle of approximately 165 to 175 degrees.

With respect to the disclosure, the ranges or value ranges or multiple ranges indicated above and below also include all intermediate values, particularly in ¹⁄₁₀ increments of the respective dimension, but optionally also dimensionless. For example, the indication one-third to three-fifth also includes the disclosure of 0.43 to 0.6, 0.33 to 0.5, 0.43 to 0.5, the disclosure of 165 to 175 degrees also includes the disclosure of 165.1 to 175 degrees, 165 to 174.9 degrees, 165.1 to 174.9 degrees, etc. The respective disclosure may on the one hand serve for defining a lower and/or upper limit of a cited range, but alternatively or additionally also for disclosing one or more singular values from a respectively indicated range.

BRIEF DESCRIPTION OF THE DRAWINGS

The invention is described in greater detail below with reference to the attached drawings. In these drawings:

FIG. 2 shows a projection of the cutting tool according to FIG. 1;

FIG. 3 shows a side view of FIG. 2;

FIG. 4 shows a rear view of the cutting tool in the closed cutting mouth position;

FIG. 5 shows an enlarged detail of the region V in FIG. 2, but concerning an open cutting mouth position;

FIG. 6 shows an illustration corresponding to FIG. 5, but concerning an intermediate closed position with a superimposition of the cutting edges in a first closing region;

FIG. 8 shows a follow-up illustration to FIG. 6 concerning another intermediate position in the course of a closing process of the cutting mouth;

FIG. 9 shows an enlarged detail of the region IX in FIG. 8;

DESCRIPTION OF THE EMBODIMENTS

Figure 1:
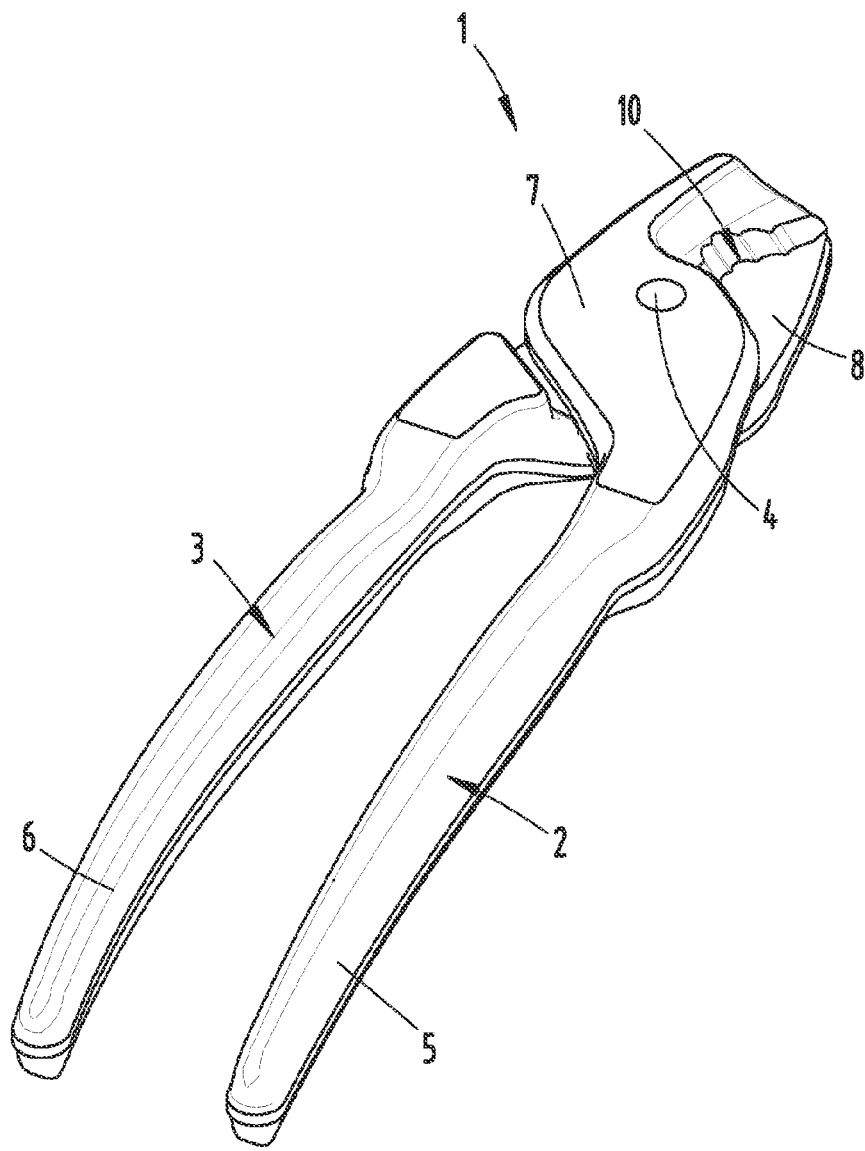
FIG. 1 shows a perspective view of a pliers-type cutting tool concerning the closed cutting mouth position.

A pliers-type cutting tool 1 is initially described with reference to FIGS. 1 to 4, wherein said cutting tool is in this preferred example realized in the form of a cable cutter with two tool legs 2 and 3, which intersect in a region that preferably is formed by a joint pin 4 (sector). A geometric rotational axis x preferably can also extend through the joint pin 4 centrally. The tool legs can be pivoted relative to one another along a pivot plane E. The cutting edges preferably lie on top of one another in a sliding manner in the pivot plane E. The rotational axis x preferably is aligned perpendicular to the pivot plane E.

The tool legs 2 and 3 respectively form handle sections 5 and 6 on one side of the rotational axis x and cutting jaws 7 and 8 on the other side of the rotational axis x. The cutting edges 10 and 11 of the cutting jaws 7 and 8 define a cutting mouth 9 at least in an open position, e.g. according to FIG. 5.

In the exemplary embodiment shown, the cutting jaws 7 and 8, as well as the cutting edges 10 and 11 formed thereon, essentially are designed identically. However, the following explanations concerning the design of the cutting edges 10, 11 may also refer to a cutting tool 11 that has cutting edges 10 and 11 with different designs. For example, the concave cutting regions described in greater detail below may only be formed on one cutting edge whereas the other cutting edge extends straight or in an altogether curved manner and/or has no or more or fewer concave cutting regions or concave cutting regions that are geometrically or dimensionally designed differently from the concave cutting regions of the one cutting edge.

Each cutting edge 10, 11 initially has an overall length g along a straight line that begins at an intersecting point P with the opposite cutting edge located near the joint and a free end of the cutting edge located distant from the joint (compare to FIG. 5). If a change regarding the intersecting point occurs in the course of a movement of the tool legs relative to one another, the description is based on the open position of the cutting tool. In this case, each cutting edge 10 and 11 may viewed in the direction of the opposite cutting edge 11 or 10 have, in abstract terms, an essentially concave, crescent-shaped contour over approximately two-thirds to three-fourths of the overall g starting the length from intersecting point P with the opposite cutting edge near the joint, wherein said concave contour may on the end of the respective cutting edge 10 or 11 transform into two straight sections 12, 13 that follow in the direction of the overall length g.

Figure 7:
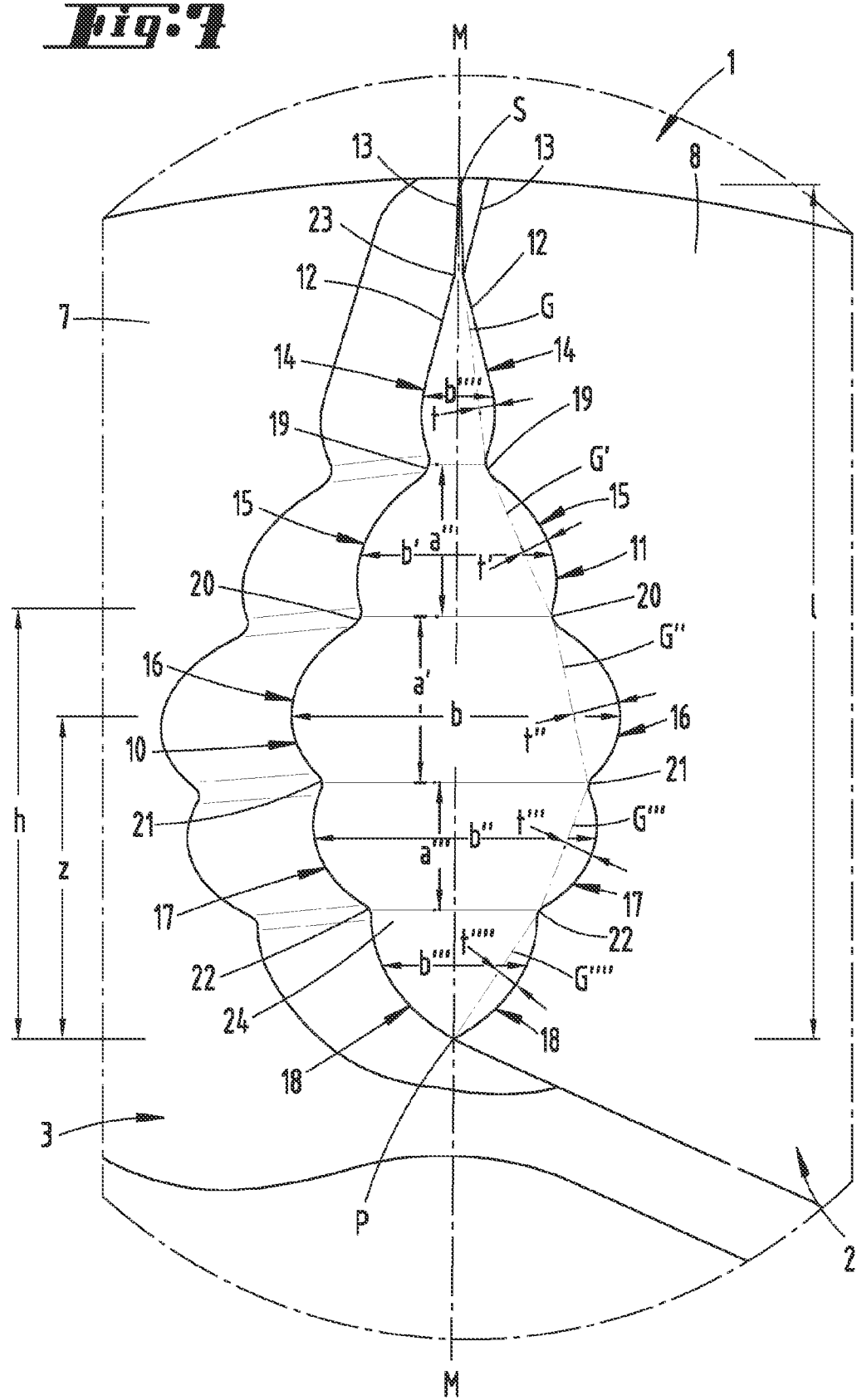
FIG. 7 shows an enlarged detail of the region VII in FIG. 6.

In this case, a radially outermost straight section 13 with respect to the rotational axis x preferably can extend in a continuously elongate manner whereas the other straight section 13, which follows this outermost straight section 13 radially inward, may in the region of the end facing away from the straight section 13 transform into a concavely curved section under inclusion of an obtuse angle of preferably more than 160 degrees, e.g. 170 or 175 degrees, with the straight section 13 (compare also to the enlarged illustration in FIG. 7).

Viewed over the length of each cutting edge 10, 11, each cutting edge 10, 11 preferably has a plurality of concave cutting regions 14, 15, 16, 17 and 18 that are separated from one another and altogether essentially arranged along an imaginary concave line. The cutting regions 14 to 18 are separated from one another by point-like webs 19, 20, 21 and 22 that are oriented inward in the direction of the cutting mouth 9. Accordingly, the ends of the cutting regions 15, 16 and 17, in particular, are respectively delimited by such a web 19 to 22 on both sides. Furthermore, the obtusely angled transition of the two straight sections 12 and 13 into one another may also be formed by another point-like web 23. A web may be formed by a point on a transition between two regions that are rounded in the same direction, but differ with respect to a center point or a focusing region of a rounding. The point may also be rounded by means of an oppositely directed curvature.

In FIG. 7, the webs 19 to 23 are connected by means of imaginary straight lines G, G', G", G'" and G"". These straight lines G to G"" accordingly span the respective concave cutting regions 14 to 18.

Each of the concave cutting regions 14 to 18 has a greatest depth t, t', t", t'" and t"" perpendicular to these straight lines G to G"", wherein the greatest depth t is according to the illustration assigned to the cutting region 14 with the straight line G, the greatest depth t' is assigned to the cutting region 15 with the straight line G', the greatest depth t" is assigned to the cutting region 16 with the straight line G", the greatest depth t'" is assigned to the cutting region 17 with the straight line G'" and the greatest depth t"" is assigned to the cutting region 18 with the straight line G"".

It is furthermore preferred that the cutting regions 14 to 18 have more than two different greatest depths t to t"". In this case, an absolute greatest depth describes the greatest depth t" of the cutting region 16 starting from the straight line G". Furthermore, the greatest depths t' and t'" of the cutting regions 15 and 17 located adjacent to the cutting regions 16 with the absolute greatest depth t" may have at least approximately the same size. For example, the values of these greatest depths t' and t'" may correspond to approximately 0.45-times to 0.55-times the value of the absolute greatest depth t". The other cutting regions 14 and 18 have smaller greatest depths t and t"" than the cutting regions 15 and 17. For example, the cutting region 18 located closest to the rotational axis x may have a greatest depth t"" that corresponds to approximately 0.4-times to 0.5-times the absolute greatest depth t" and the concave cutting region 14 located farthest from the rotational axis x may have a greatest depth t that corresponds to approximately 0.3-times to 0.4-times the absolute greatest depth. Accordingly, five concave cutting regions with at least four different greatest depths are formed in the described exemplary embodiment.

The respective concave cutting regions 15, 16, 17 and 18 preferably can be formed by a cutting edge section that extends in a continuously curved manner. This curved cutting edge section may be continuously described by a constant radius dimension from one web to the next web. Alternatively, curvatures with different radii may continuously transform into one another over the longitudinal extent of such a cutting edge section as shown. It is preferred that only the concave cutting region 14 located farthest from the rotational axis x is composed of a curved cutting edge section, which is located directly adjacent to the web 19 separating the cutting region 14 from the adjacent cutting region 15, and the straight section 12 following the curved cutting edge section.

Starting from the open cutting mouth position or the position according to FIG. 5, respectively, the cutting edges initially arrive in an overlapping position in a first closing region S when the cutting tool is closed; compare to FIGS. 6 and 7.

The illustration in FIG. 7 furthermore shows that, in a perpendicular projection of the cutting regions 14, 15, 16, 17 or 18 on the central plane M, distances a', a" and a'" may be formed between the webs 19, 20, 21, 22 or 23 separating two adjacent cutting regions 14, 15, 16, 17 or 18 in the overlapping position of the cutting edges 10 and 11 in only the closing region S. In a potential embodiment, such a distance a', a" or a'" may be identical or approximately identical to the distance a', a" or a'" of the directly adjacent cutting region 14, 15, 16, 17 or 18 or alternatively correspond to approximately 0.7-times to 1.3-times the distance a', a" or a'" of the directly adjacent cutting region 14, 15, 16, 17 or 18.

During a movement of the cutting jaws 7 and 8 in the direction of a closed position according to FIGS. 1 to 4, e.g. for cutting a workpiece W such as a cable inserted into the cutting mouth 9, a first closing region S, which preferably is a closing point, is reached in the region of the free ends of the cutting edges 10 and 11 located distant from the rotational axis x as a result of the superimposed position of the cutting edges 10 and 11—viewed in the extending direction of the rotational axis x (compare to FIGS. 6 and 7). A closed cutting opening 24, in which the workpiece W lies, is reached for the first time upon reaching this first closing region S in the course of the closing process of the cutting tool 1. The closing region is based on a point for the essential relevance in this respect. A surface—that is a small as possible—this always formed in practical applications.

In this position of the tool legs 2 and 3 or the cutting jaws 7 and 8 with a contact or an overlapping position in only this first closing region S, the cutting edges 10 and 11 have a free length l along a central plane M that stands perpendicular to the cutting plane E and extends through the rotational axis x and the closing region S. This central plane M extends through the point or centrally through the resulting surface in the closing region S. Furthermore, this central plane M may optionally form an axis of symmetry in any pivoting position of the tool legs 2 and 3 or the cutting jaws 7 and 8 and with respect to a top view according to the illustrations in FIGS. 5 to 13, in which the pivot plane E forms a surface and the central plane M forms a line, wherein the visible contours of the two cutting edges 10 and 11 and therefore the contours defining the cutting opening 24 may mirror one another to both sides of this axis of symmetry.

The free length l in the closed position, in which the first closing region S is reached, may correspond to approximately 0.9-times or more, e.g. up to 0.99-times or more, the overall length g of a respective cutting edge 10 or 11.

In the above-described closed position according to FIG. 7, a maximum opening width b is formed at an intermediate length z on the central plane M, preferably perpendicular to the central plane M, wherein said maximum opening width preferably can correspond to two-fifth or more of the overall length g of the respective cutting edges 10 and 11. In the exemplary embodiment shown, this maximum opening width b preferably is formed in the region of the cutting regions 16 with the absolute greatest depths t", which preferably lie symmetrically opposite of one another with respect to the central plane M. In this case, the intermediate length z is just like the above-described free length l formed starting from the intersecting point P of the cutting edges 10 or 11 or the cutting regions 18 of both cutting edges 10 and 11 near the rotational axis x and proceeds in the direction of the free ends of the cutting edges 10 and 11 or in the direction of the closing region S, respectively.

In another embodiment, the maximum opening width b in the closed position according to FIG. 7 may correspond to approximately 2-times to 3-times a distance a', a" or a'" between two webs 19, 20, 21, 22 or 23 separating a cutting region 14, 15, 16, 17 or 18.

As described above with reference to the maximum opening width b, a respectively greatest opening width b', b'", b'" and b"" is also formed for other cutting regions 14, 15, 17 and 18 in the position according to FIG. 7. In the exemplary embodiment, a second cutting region 15 and a third cutting region 16 are formed starting from the first cutting region 14 that follows the closing region S in the direction of the rotational axis x, wherein the greatest opening widths b' and b of the second and third cutting regions (which in the cutting region 16 coincides with the maximum opening width b) is respectively greater than the greatest opening width b' or b"" of each of the preceding cutting regions 14, 15. The respectively opposite cutting regions 14, 15, 16 preferably have-referred to the central plane M—an identical cutting region length, which in FIG. 7 is identified by the distances a, a', a" and a'".

The beginning of the cutting edges 10 and 11 in the intersecting point P is with respect to a first closed position spaced apart from the rotational axis x along the central plane M, wherein this distance a may correspond to three-fifth or less, furthermore to approximately 0.4-times to 0.6-times, the overall length g of the respective cutting edges 10 and 11. In other respects, the straight line G"", which originates from the web 22 and spans the cutting region 18, is also directed at this intersecting point P that lies on the central plane M.

According to another preferred embodiment, the two cutting regions 16 with the respectively absolute greatest depth t" are with respect to the free length l assigned to half (half dimension h in FIG. 7) or the region following the half in the direction of the rotational axis x. The illustration in FIG. 7, in particular, shows that the distance over the intermediate length z along the central plane M starting from the intersecting point P to the region of the maximum opening width b is chosen smaller than the half dimension h of the free length l. According to the exemplary embodiment shown, the intermediate length z may correspond to approximately 0.5-times to 0.9-times, furthermore to approximately 0.7-times to 0.8-times, the half dimension h or to approximately 0.25-times to 0.45-times, furthermore to approximately 0.35-times to 0.4-times, the free length l.

Starting from the position with a contact or an overlapping position of the cutting edges 10 and 11 in only the (first) closing region S, closing of the cutting mouth 9 or the cutting regions delimiting the cutting mouth 9 initially takes place essentially from the radially outer side toward the radially inner side-referred to the rotational axis x. In this case, the radially outer cutting regions 14 and 15 initially segregate from the free length l, wherein a superimposed position in another closing region is in an intermediate position according to the illustrations in FIGS. 8 and 9 reached in the region of the facing webs 19 of both cutting edges 10 and 11. In this closed position of the cutting jaws 7 and 8, a residual opening 25, which is delimited on both sides in the extending direction of the central plane M, is formed between the cutting regions 15 of both cutting edges 10 and 11 whereas the cutting regions 15, 16, 17 and 18 delimit an altogether essentially rhomboidal opening R that is illustrated with the straight lines G', G", G'" and G"" in this intermediate position, wherein the length of a longitudinal rhombus axis of said rhomboidal opening along the central plane M may correspond to approximately 1.8-times to 2.2-times, furthermore to approximately 2-times, the length of the lateral rhombus axis extending transverse thereto. According to the exemplary embodiment, the rhomboidal opening preferably is composed of a plurality of edge regions, i.e. cutting edges, that extend in a curved manner. The straight lines G', G", G'" and G"" furthermore show that the rhomboidal shape preferably is also atypical insofar as two or more inflection points are formed on a longitudinal side.

Figure 10:
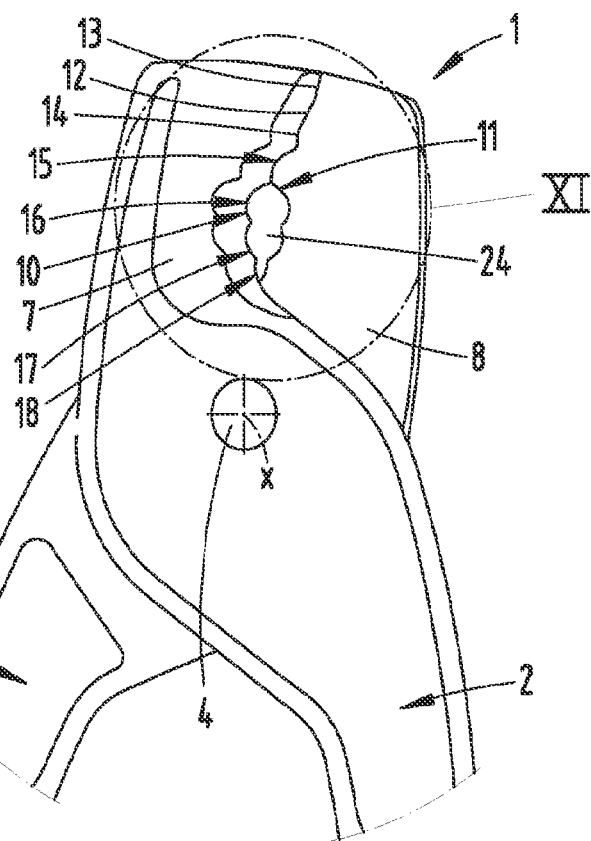
FIG. 10 shows a follow-up illustration to FIG. 8 concerning another intermediate position in the course of a closing process.
Figure 11:
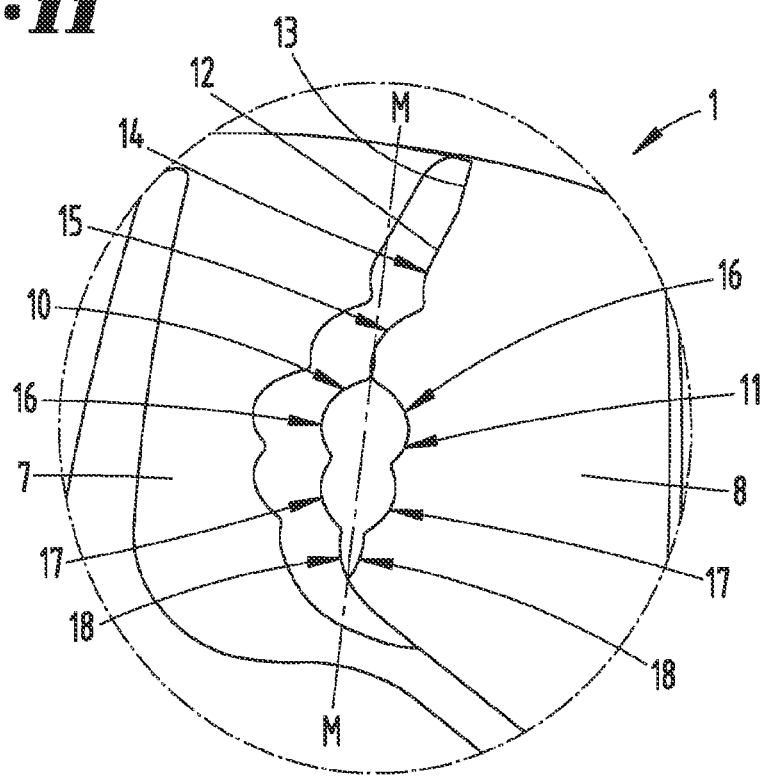
FIG. 11 shows an enlarged detail of the region XI in FIG. 10.

FIGS. 10 and 11 show a follow-up illustration to FIGS. 8 and 9 in the course of the further closing process. According to these figures, the cutting mouth 9 is initially closed in the region of the radially outer cutting regions 15 and subsequently closed in the region of the radially inner cutting regions 18.

Figure 12:
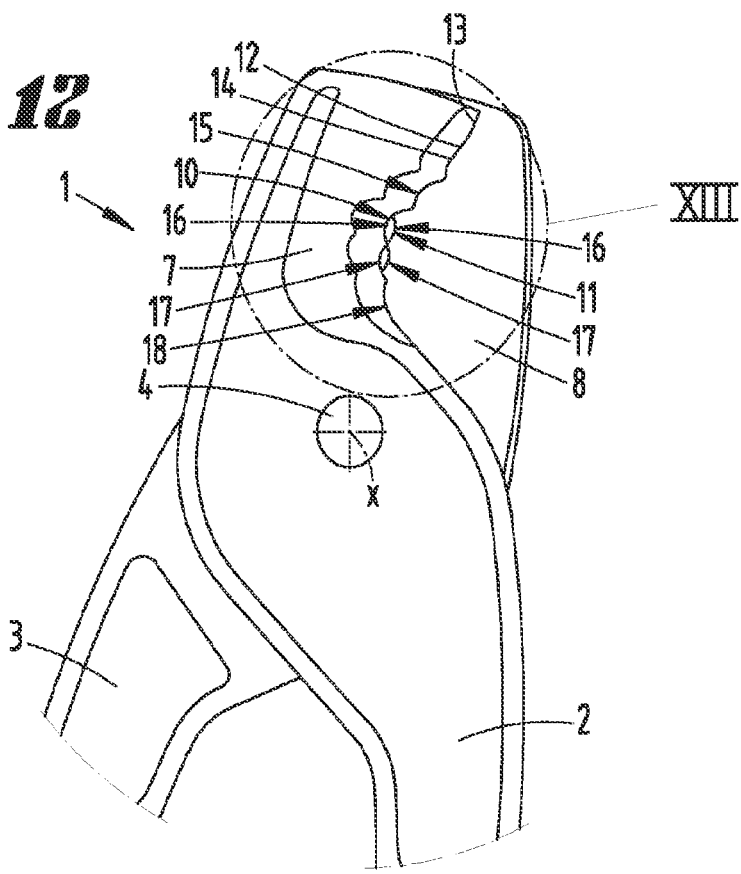
FIG. 12 shows a follow-up illustration to FIG. 10.
Figure 13:
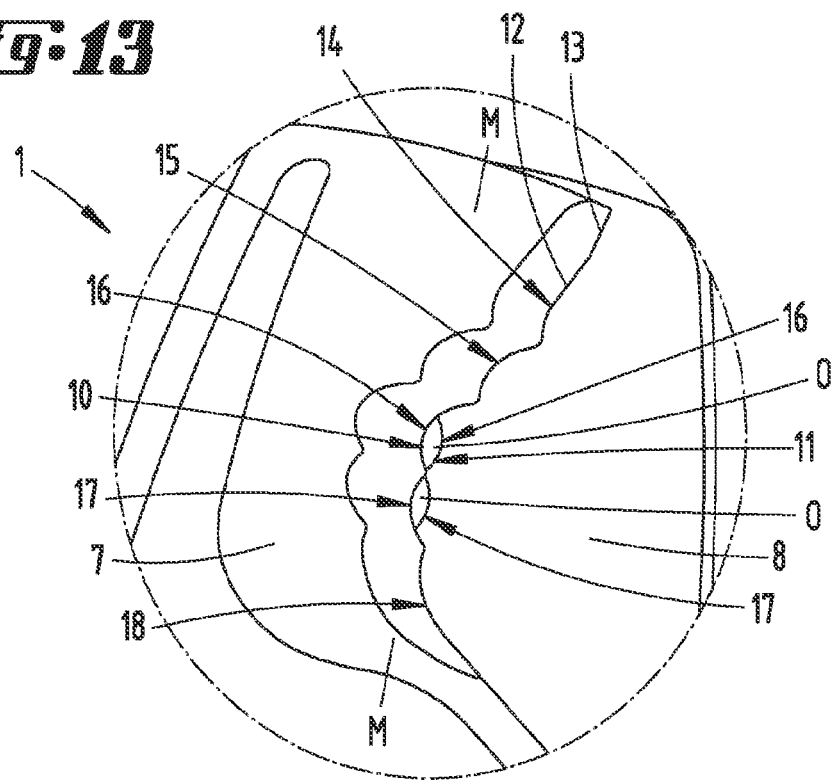
FIG. 13 shows an enlarged detail of the region XIII in FIG. 12.

FIGS. 12 and 13 furthermore show that two remaining concave cutting regions 16 and 17 may in the course of the further closing of the cutting mouth 9 form openings O, which with respect to the central plane M are arranged adjacent to one another and separated from one another, wherein said openings can be transferred into a superimposed position and therefore into a closed position, optionally at essentially the same time, as a result of a corresponding displacement of the tool legs 2 and 3 into a final closed position according to FIG. 4 such that no free length l any longer exists in the closed position according to FIG. 4.

The preceding explanations serve for elucidating all inventions that are included in this application and respectively enhance the prior art independently with at least the following combinations of characteristics, wherein two, multiple or all of these combinations of characteristics may also be combined with one another, namely:

A cutting tool, which is characterized in that a maximum opening width b between the cutting edges 10, 11 is in the first closed position formed over the free length l in a direction transverse to the central plane M, and in that the maximum opening width b amounts to one-third or more of an overall length g of the cutting edges 10, 11.

A cutting tool, which is characterized in that each cutting edge 10, 11 only has three to seven cutting regions 14, 15, 16, 17, 18 over the free length l, in that at least two cutting regions 14, 15, 16, 17, 18 of each cutting edge 10, 11 have a greatest depth t, t', t", t'" t"" of 0.4 millimeters or more, and in that, in a perpendicular projection of the pointedly ending webs 19, 20, 21, 22, 23 on the central plane M, the resulting distances a', a", a'" between the webs 19, 20, 21, 22, 23 along the central plane M correspond to the individual cutting regions 14, 15, 16, 17, 18, wherein the distance a', a", a'" between two webs 19, 20, 21, 22, 23 of a cutting region 14, 15, 16, 17, 18 corresponds to 0.7-times to 1.3-times the distance a', a", a'" between two webs 19, 20, 21, 22, 23 of the adjacent cutting region 14, 15, 16, 17, 18.

A cutting tool, which is characterized in that at least a second and a third cutting region 15, 16 follow the first cutting region 14, which follows the closing region in the direction of the rotational axis x, wherein the greatest opening width of the second and the third cutting region is respectively greater than the greatest opening width of each of the preceding cutting regions, and in that the respective opposite cutting regions have an identical partial length with respect to the central plane M.

A cutting tool, which is characterized in that cutting regions 14, 15, 16, 17, 18 with more than two different greatest depths t, t', t", t''', t'''' are provided, and in that a cutting region 16 of absolute greatest depth t" is with respect to the free length l assigned to half of the free length l or a region following the half toward the rotational axis x.

A cutting tool, which is characterized in that, in an overlapping position of the tool legs 2, 3 in only the closing region S, the free length l amounts to nine-tenths or more of the overall length g of the cutting edges 10, 11 and the greatest opening width b amounts to two-fifth or more of the overall length g of the cutting edges 10, 11.

A cutting tool, which is characterized in that the cutting edges 10, 11 begin at a distance a on the central plane M, which starting from the rotational axis x amounts to three-fifth or less of the overall length g of the cutting edges 10, 11.

A cutting tool, which is characterized in that, starting from an overlapping position in only the closing region S, two radially outer concave cutting regions 10, 11 initially only segregate successively from the free length 1 from the radially outer side toward the radially inner side with respect to the rotational axis x during further closing of the cutting tool 1.

A cutting tool, which is characterized in that two remaining concave cutting regions 16, 17 are during further closing of the cutting tool 1 transferable into a position in which two openings O remain, which with respect to the central plane M are arranged adjacent to one another and separated from one another.

A cutting tool, which is characterized in that no free length l exists when the cutting tool 1 is closed.

A cutting tool, which is characterized in that a concave cutting region 14, 15, 16, 17, 18 is formed by a cutting edge section that extends in a continuously curved manner.

A cutting tool, which is characterized in that the tool legs 2, 3 are in the course of a closing movement of the cutting tool 1 transferable into a position in which the cutting edges 10, 11 form in a two-sided design of the concave cutting regions 14, 15, 16, 17, 18 an essentially rhomboidal opening R when the webs 19, 20, 21, 22, 23 of the cutting regions 14, 15, 16, 17, 18 on each cutting edge 10, 11 are respectively connected to one another or connected to the central plane M radially inward by an imaginary straight line G, G', G", G''', G''''.

All disclosed characteristics are essential to the invention (individually, but also in combination with one another). The disclosure of the associated/attached priority documents (copy of the priority application) is hereby fully incorporated into the disclosure content of this application, namely also for the purpose of integrating characteristics of these documents into claims of the present application. The characteristics of the dependent claims also characterize independent inventive enhancements of the prior art without the characteristics of a claim to which they refer, particularly for submitting divisional applications on the basis of these claims. The invention specified in each claim may additionally comprise one or more of the characteristics that were disclosed in the preceding and, particular, are description in identified by reference symbols and/or included in the list of reference symbols. The invention also concerns design variations, in which individual characteristics cited in the preceding description are not realized, particularly as far as they are obviously dispensable for the respective intended use or can be replaced with other, identically acting technical means.

LIST OF REFERENCE SYMBOLS

1 Cutting tool
2 Tool leg
3 Tool leg
4 Joint pin
5 Handle section
6 Handle section
7 Cutting jaw
8 Cutting jaw
9 Pliers mouth
10 Cutting edge
11 Cutting edge
12 Straight section
13 Straight section
14 Cutting region
15 Cutting region
16 Cutting region
17 Cutting region
18 Cutting region
19 Web
20 Web
21 Web
22 Web
23 Web
24 Cutting opening
25 Residual opening
a Distance
a' Distance
a" Distance
a''' Distance
b Opening width
b' Opening width
b" Opening width
b''' Opening width
b'''' Opening width
g Overall length
h Half dimension
l Free length
t Greatest depth
t' Greatest depth
t" Greatest depth
t''' Greatest depth
t'''' Greatest depth
x Rotational axis
z Intermediate length
E Pivot plane
G Straight line
G' Straight line
G" Straight line
G''' Straight line
G'''' Straight line
M Central plane
O Opening
P Intersecting point
R Rhomboidal opening
S Closing region
W Workpiece

The invention claimed is:

1. A pliers-type cutting tool (1) comprising two tool legs (2, 3) that are pivotable relative to one another about a rotational axis (x) along a pivot plane (E), wherein the tool legs (2, 3) form handle sections (5, 6) on one side of the rotational axis (x) and a pliers mouth (9) on the other side, wherein working faces of the pliers mouth (9) are designed in the form of opposite cutting edges (10, 11), which during a movement into a closed position of the cutting tool (1)

arrive in a superimposed position in a closing region(S) for the first time in a first closed position radially outside of a remaining opening region viewed from the rotational axis (x), wherein multiple cutting regions (14, 15, 16, 17, 18), which are oppositely formed on the working faces, respectively have their own curvature contour and form the opening region, follow radially inward in such a position, and wherein the cutting edges (10, 11) have with respect to a central plane (M), which stands perpendicular to the pivot plane (E) and extends through the rotational axis (x) and the closing region(S), a free length (l) starting from the closing region(S) and proceeding in the direction of the rotational axis (x) on the central plane (M) in the first closed position, up to an intersecting point (P) of the opposite cutting edges, the free length (l) having an upper half toward the closing region(S) and a lower half toward the rotational axis (x), wherein a maximum opening width (b) between the cutting edges (10, 11) is in the first closed position formed over the free length (l) in a direction transverse to the central plane (M), wherein the maximum opening width (b) amounts to one-third or more of an overall length (g) of the cutting edges (10, 11), wherein the overall length (g) extends along a straight line that begins at the intersecting point (P) with the opposite cutting edge located near the joint and a free end of the cutting edge located distant from the joint, and wherein a greatest opening width (b', b'', b''', b'''') respectively results for the cutting regions (14, 15, 16, 17), wherein a second cutting region and a third cutting region (15, 16) are formed starting from a first cutting region (14), which follows the closing region(S) in the direction of the rotational axis (x), wherein the greatest opening width (b', b) of the second cutting region and the third cutting region is respectively greater than the greatest opening width (b', b'''') of each of the preceding cutting regions (14, 15), wherein the central plane (M) forms an axis of symmetry with respect to an illustration in which the pivot plane (E) forms a surface and the central plane (M) forms a line, wherein the visible contours of the two cutting edges (10, 11) and therefore the contours defining the cutting opening (24) mirror one another to both sides of this axis of symmetry,
  wherein the first, second and third cutting regions (14, 15, 16) are each disposed between two pointedly ending webs (19, 20, 21, 22), wherein the first, second and third cutting regions have different greatest depths (t, t', t'', t''', t'''') or different distances (a', a'', a''') between the pointedly ending webs (19, 20, 21, 22) between which each one of the cutting regions is disposed, wherein each of the greatest depths (t, t', t'', t''') of the first, second and third cutting regions are measured along an imaginary perpendicular line to an imaginary straight line (G, G' G''), which closes the each cutting region and extends respectively between two of the pointedly ending webs (19, 20, 21, 22), and runs between the imaginary straight line (G, G', G'') to a deepest point of the respective cutting region;
  wherein a first the greatest depth (t'') of the third cutting region (16) is larger than the greatest depths (t, t', t''', t'''') of the other cutting regions, and wherein the third cutting region (16) is located in the lower half of the free length (l) and wherein each cutting edge viewed in the direction of the opposite cutting edge (11, 10) has a concave, crescent-shaped contour over approximately two-thirds to three-fourths of the overall length (g).

2. The cutting tool according to claim 1, wherein, in an overlapping position of the tool legs (2, 3) in only the closing region(S), the free length (l) amounts to nine-tenths or more of the overall length (g) of the cutting edges (10, 11) and the maximum opening width (b) amounts to two-fifth or more of the overall length (g) of the cutting edges (10, 11).

3. The cutting tool according to claim 1, wherein the cutting edges (10, 11) begin at a distance (a) on the central plane (M), which starting from the rotational axis (x) amounts to three-fifth or less of the overall length (g) of the cutting edges (10, 11).

4. The cutting tool according to claim 1, wherein, starting from an overlapping position in only the closing region(S), two radially outer concave cutting regions (10, 11) initially only segregate successively from the free length (l) from the radially outer side toward the radially inner side with respect to the rotational axis (x) during further closing of the cutting tool (1).

5. The cutting tool according to claim 4, wherein two remaining concave cutting regions (16, 17) are during further closing of the cutting tool (1) transferable into a position in which two openings (O) remain, which with respect to the central plane (M) are arranged adjacent to one another and separated from one another.

6. The cutting tool according to claim 4, wherein no free length (l) exists when the cutting tool (1) is closed.

7. The cutting tool according claim 1, wherein concave, crescent-shaped contour is formed by a cutting edge section that extends in a continuously curved manner.

8. The cutting tool according to claim 1, wherein the tool legs (2, 3) are in the course of a closing movement of the cutting tool (1) transferable into a position in which the cutting edges (10, 11) form in a two-sided design of the concave cutting regions (14, 15, 16, 17, 18) an essentially rhomboidal opening (R) when the webs (19, 20, 21, 22, 23) of the cutting regions (14, 15, 16, 17, 18) on each cutting edge (10, 11) are respectively connected to one another or connected to the central plane (M) radially inward by an imaginary straight line (G, G', G'', G''', G'''').

9. The pliers type cutting tool (1) according to claim 1, wherein the first, second and third cutting regions are provided with more than two different greatest depths.

10. The pliers type cutting tool (1) according to claim 1, wherein the distance (a', a'' or a''') between the pointedly ending webs of one of the cutting regions corresponds to approximately 0.7 times to 1.3 times the distance (a', a'' or a''') between the pointedly ending webs of the directly adjacent cutting region.

11. The pliers type cutting tool (1) according to claim 1, wherein the distance (a', a'' or a''') between the pointedly ending webs of one of the cutting regions corresponds to approximately 0.7 times to 1.3 times the distance (a', a'' or a''') between the pointedly ending webs of the directly adjacent cutting region.

12. The pliers type cutting tool (1) according to claim 1, wherein cutting regions located adjacent to the cutting region with an absolute greatest depth have a greatest depth corresponding 0.45 to 0.55 times the absolute greatest depth.

13. The pliers type cutting tool (1) according to claim 12, wherein the cutting regions further to the cutting region the absolute greatest depth and adjacent the cutting regions adjacent to the cutting region with the absolute greatest depth have a greatest depth of 0.4 times to 0.5 times the absolute greatest depth.

14. A pliers-type cutting tool (1) comprising two tool legs (2, 3) that are pivotable relative to one another about a rotational axis (x) in a pivot plane (E), wherein the tool legs (2, 3) form handle sections (5, 6) on one side of the rotational axis (x) and a pliers mouth (9) on the other side, wherein working faces of the pliers mouth (9) are designed in the form of opposite cutting edges (10, 11), which during a movement into a closed position of the cutting tool (1) arrive in a superimposed position in a closing region(S) for the first time in a first closed position radially outside of a remaining opening region, wherein the cutting edges (10, 11) have with respect to a central plane (M), which stands perpendicular to the pivot plane (E) and extends through the rotational axis (x) and the closing region(S), a free length (l) starting from the closing region(S) and proceeding in the direction of the rotational axis (x) on the central plane (M) in the first closed position, up to an intersecting point (P) of the opposite cutting edges, the free length (l) having an upper half toward the closing region(S) and a lower half toward the rotational axis (x), wherein both cutting edges (10, 11) have separated concave cutting regions (14, 15, 16, 17, 18) over the free length (l), wherein each cutting edge (10, 11) only has three to seven cutting regions (14, 15, 16, 17, 18) over the free length (l), wherein at least two of the cutting regions (14, 15, 16, 17, 18) of each cutting edge (10, 11) have a greatest depth (t, t', t'', t''' t'''') of 0.4 millimeters or more, and wherein, in a perpendicular projection of the pointedly ending webs (19, 20, 21, 22, 23) on the central plane (M), the resulting distances (a', a'', a''') between the webs (19, 20, 21, 22, 23) along the central plane (M) correspond to the individual cutting regions (14, 15, 16, 17, 18), wherein the distance (a', a'', a''') between two webs (19, 20, 21, 22, 23) of a cutting region (14, 15, 16, 17, 18) corresponds to 0.7-times to 1.3-times the distance (a', a'', a''') between two webs (19, 20, 21, 22, 23) of the adjacent cutting region (14, 15, 16, 17, 18), wherein the first, second and third cutting regions (14, 15, 16) are each disposed between two pointedly ending webs (19, 20, 21, 22), wherein the first, second and third cutting regions have different greatest depths (t, t', t'', t''', t'''') or different distances (a', a'', a''') between the pointedly ending webs (19, 20, 21, 22) between which each one of the cutting regions is disposed, wherein each of the greatest depths (t, t', t'', t''') of the first, second and third cutting regions are measured along an imaginary perpendicular line to an imaginary straight line (G, G' G''), which closes the each cutting region and extends respectively between two of the pointedly ending webs (19, 20, 21, 22), and runs between the imaginary straight line (G, G', G'') to a deepest point of the respective cutting region;

wherein the greatest depth t'') of the third cutting region (16) is larger than the greatest depths (t, t', t''', t'''') of the other cutting regions, and wherein the third cutting region (16) is located in the lower half of the free length (l) and wherein each cutting edge has viewed in the direction of the opposite cutting edge (11, 10) a concave, crescent-shaped contour over approximately two-thirds to three-fourths of the overall length (g).

15. The pliers type cutting tool (1) according to claim 14, wherein the first, second and third cutting regions are provided with more than two different greatest depths.

16. A pliers-type cutting tool (1) comprising two tool legs (2, 3) that are pivotable relative to one another about a rotational axis (x) along a pivot plane (E), wherein the tool legs (2, 3) form handle sections (5, 6) on one side of the rotational axis (x) and a pliers mouth (9) on the other side, wherein working faces of the pliers mouth (9) are designed in the form of opposite cutting edges (10, 11), which during a movement into a closed position of the cutting tool (1) arrive in a superimposed position in a closing region(S) for the first time in a first closed position radially outside of a remaining opening region viewed from the rotational axis (x), wherein multiple cutting regions (14, 15, 16, 17, 18), which are oppositely formed on the working faces, respectively each have a curvature contour and form the opening region, follow radially inward in the first closed position, wherein the cutting edges (10, 11) have with respect to a central plane (M), which stands perpendicular to the pivot plane (E) and extends through the rotational axis (x) and the closing region(S), a free length (l) starting from the closing region(S) and proceeding in the direction of the rotational axis (x) on the central plane (x) in the first closed position, up to an intersecting point (P) of the opposite cutting edges, the free length (l) having an upper half toward the closing region(S) and a lower half toward the rotational axis (x), and wherein a greatest opening width (b) respectively results for two opposite cutting regions viewed in a direction transverse to the central plane (M), wherein at least a second cutting region and a third cutting region (15, 16) follow a first cutting region (14), which follows the closing region in the direction of the rotational axis (x), wherein the greatest opening width of the second cutting region and the third cutting region (16) is respectively greater than the greatest opening width of each of the preceding cutting regions (14, 15), and wherein two remaining concave cutting regions (16, 17) are during further closing of the cutting tool (1) transferable into a position in which two openings (O) remain, which with respect to the central plane (M) are arranged adjacent to one another and separated from one another, wherein the first, second and third cutting regions (14, 15, 16) are each disposed between two pointedly ending webs (19, 20, 21, 22), wherein the first, second and third cutting regions have different greatest depths (t, t', t'', t''') or different distances (a', a'', a''') between the pointedly ending webs (19, 20, 21, 22) between which each one of the cutting regions is disposed, wherein each of the greatest depths (t, t', t'', t''') of the first, second and third cutting regions are measured along an imaginary perpendicular line to an imaginary straight line (G, G' G''), which closes the each cutting region and extends respectively between two of the pointedly ending webs (19, 20, 21, 22), and runs between the imaginary straight line (G, G', G'') to a deepest point of the respective cutting region;

wherein the greatest depth t'') of the third cutting region (16) is larger than the greatest depths (t, t', t''', t'''') of the other cutting regions, and wherein the third cutting region (16) is located in the lower half of the free length (l) and wherein each cutting edge viewed in the direction of the opposite cutting edge (11, 10) has a concave, crescent-shaped contour over approximately two-thirds to three-fourths of the overall length (g).

17. The pliers type cutting tool (1) according to claim 16, wherein the first, second and third cutting regions are provided with more than two different greatest depths.

18. The pliers type cutting tool (1) according to claim 16, wherein the distance (a', a'' or a''') between the pointedly ending webs of one of the cutting regions corresponds to approximately 0.7 times to 1.3 times the distance (a', a'' or a''') between the pointedly ending webs of the directly adjacent cutting region.

19. The pliers type cutting tool (1) according to claim 16, wherein the distance (a', a'' or a''') between the pointedly ending webs of one of the cutting regions corresponds to approximately 0.7 times to 1.3 times the distance (a', a'' or a''') between the pointedly ending webs of the directly adjacent cutting region.

* * * * *